United States Patent Office 2,820,652
Patented Jan. 21, 1958

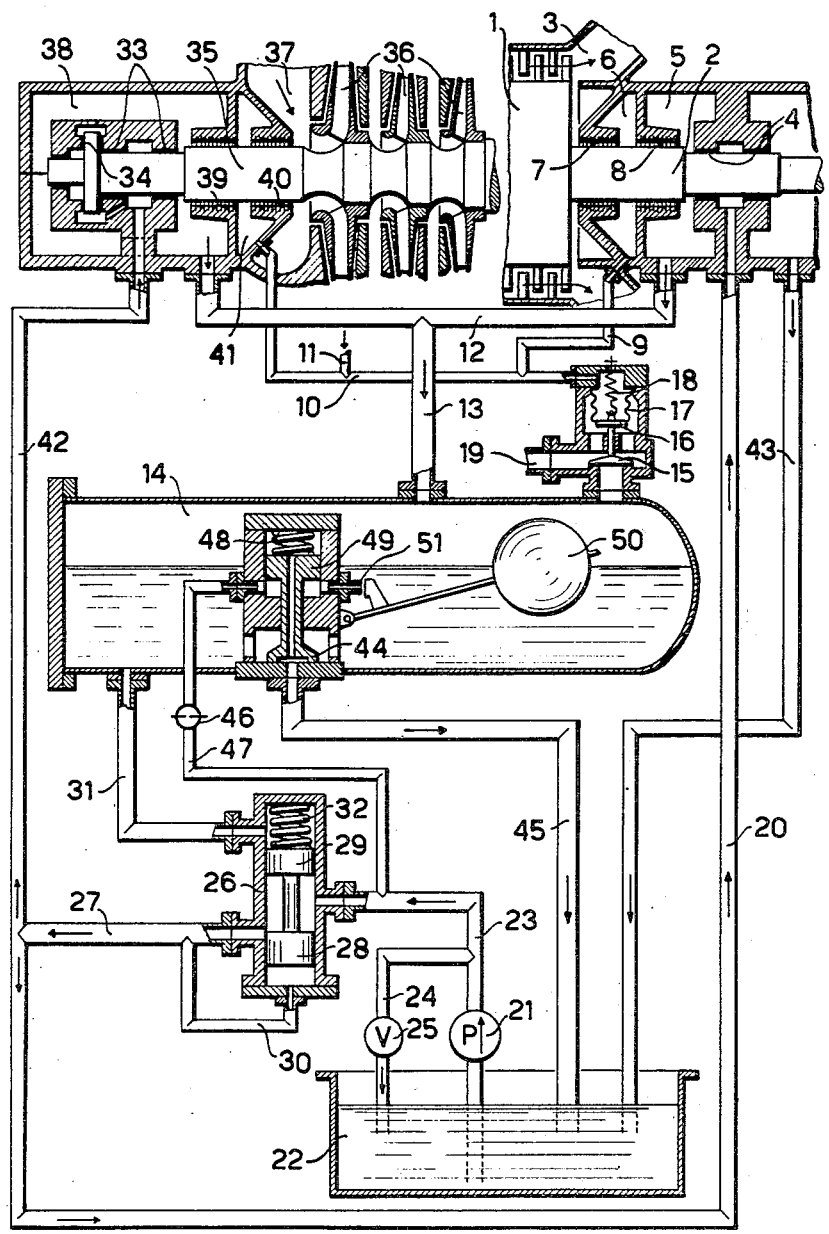

2,820,652
SHAFT SEALING ARRANGEMENT FOR TURBO-MACHINE

Konrad Oechslin, Zurich, Switzerland, assignor to Aktiengesellschaft fuer Technische Studien, Zurich, Switzerland, a corporation of Switzerland Application June 8, 1955, Serial No. 514,026

Claims priority, application Switzerland June 19, 1954

2 Claims. (Cl. 286—9)

The invention relates to an arrangement for packing by means of a liquid seal the shaft of a turbo-machine operating with a gaseous medium at variable superatmospheric pressure. The invention is in particular intended for use with the turbo-machines of thermal power plants in which a gaseous working medium describes a circuit under super-atmospheric pressure, the said medium being heated by a supply of heat from the outside, expanded in at least one turbine and re-compressed in at least one compressor, and in which plant regulation of load fluctuations is effected by varying the pressure level of the circuit.

In known constructions of such liquid-seal packing arrangements, sealing liquid is sucked by a pump from a storage container subjected to the pressure of the gas to be sealed off and brought to a pressure somewhat higher than the said gas pressure. At the sealing-off point, at which it is necessary to prevent the passage of the gaseous working medium to a point at lower pressure, generally to the atmosphere, only a part of the sealing liquid flows toward the gas to be sealed off and is then fed back to the storage container which is under the said gas pressure. The remainder of the sealing liquid flows to the point at lower pressure and must then be returned from this lower pressure by means of a further pump into the storage container subjected to the gas pressure to be sealed off.

In such arrangements, at least two pumps are therefore required, one of which produces the super-pressure with respect to the gas pressure to be sealed off, as required for the liquid seal, while the other must effect the return of the sealing liquid which escapes at the sealing point on the low-pressure side.

The arrangement according to the invention affords an improvement in that only one pump is required to perform both functions. The arrangement is characterised by a pump which brings the liquid serving for the sealing from atmospheric pressure to a fixed pressure which is higher than the highest pressure reached in the course of operation of the turbo-machine by the gas to be sealed, and by a throttling member by which the pressure of the sealing liquid is automatically reduced at any gas pressure to a pressure which exceeds by a predetermined amount the pressure of the gas to be sealed off.

A constructional form of the arrangement according to the invention is illustrated in simplified form by way of example in the accompanying drawing, which shows the packing of a shaft end of the turbine of a thermal power plant operating with a gaseous working medium.

Only a part of the rotor 1 of the turbine of the thermal power plant, together with a right-hand shaft end 2, is illustrated. After leaving the blading, the working medium having still superatmospheric pressure enters an outlet chamber 3. The shaft end 2 is mounted in a bearing 4, which serves at the same time as a liquid seal for isolating from the atmosphere a space 5 which contains gaseous working medium at superatmospheric pressure. Provided between the space 5 and the outlet chamber 3 of the turbine is a further chamber 6. A labyrinth packing 7 is disposed between the chambers 3 and 6 on the shaft portion adjoining the turbine rotor, while a labyrinth packing 8 is disposed between the chamber 6 and the space 5. Cold sealing gas taken from the circuit of the thermal power plant at a point at which the working medium is at a higher pressure than in the outlet chamber 3 of the turbine is fed through a duct 9 to the chamber 6. The sealing gas is fed at a point 11 to a duct 10 communicating with the duct 9.

Thus, a higher pressure obtains in the chamber 6 than in the outlet chamber 3 of the turbine, so that a certain quantity of cold sealing gas always flows through the labyrinth packing 7 in the direction of the turbine rotor 1 and prevents hot working medium from flowing along the shaft toward the bearing 4 after leaving the turbine.

The space 5 communicates through ducts 12 and 13 with a container 14, which serves as a gravity separator for gas and liquid and as the housing of a float-controlled trap. A part of the cold gaseous working medium acting as sealing gas flows from the chamber 6 into the space 5 by way of the labyrinth packing 8. The same superatmospheric pressure obtains in the said space 5 as in the container 14. A valve 15 is provided to ensure that the pressure in the container 14 is always somewhat lower than that in the chamber 6. The upper surface of a plate 16 connected to the closure member of the valve 15 is subjected to the action of the pressure in the duct 10 and thus also to that of the chamber 6 and is sealed by a spring bellows 17. Thus the plate 16 and bellows 17 function as a fluid-pressure motor and actuate valve 15. The closure member of valve 15, on the other hand, is subjected to the action of the pressure in the container 14. A biasing tension spring 18 ensures that the valve always will remain open when the pressure in the duct 10 and in the chamber 6 does not exceed the pressure in the chamber 14 by a certain amount. Gas can then escape from the container 14 through a duct 19 until a predetermined pressure difference is reached between the chamber 6 and the space 5 and a certain quantity of the sealing gas always flows through the labyrinth packing 8 toward the bearing 4, oil leaving the bearing being prevented from entering the sealing gas chamber 6.

The sealing liquid, that is to say, the lubricating oil of the bearing, is fed through a duct 20 to the seal, i. e. the bearing point 4, which serves at the same time to pack the turbine shaft by means of a liquid seal. The oil is sucked by a pump 21 from a storage container 22 which is under atmospheric pressure, and brought to a fixed pressure which is somewhat higher than the highest pressure reached, in the course of operation of the thermal power plant, in the space 5 by the gas to be sealed off. The conveyed oil flows from the pump 21 into a duct 23.

A relief valve 25 provided in a duct 24 ensures that a constant pressure is maintained in the duct 23. The said duct communicates through a throttling valve unit 26 and a duct 27 with the duct 20 leading to the liquid seal 4.

The throttling valve unit 26 comprises a throttling piston 28 and a further piston 29 of the same diameter, connected therewith. The space below the throttling piston 28 communicates with the duct 27 through a duct 30, and the space above the piston 29 communicates with the container 14 through a duct 31. The lower face of the piston 28 is thus subjected to the pressure of the sealing liquid fed to the seal 4, while the upper face of the piston 29 is subjected to the pressure obtaining in the container 14. A further loading of the piston 29 by a pressure spring 32 ensures that the throttling piston 26 does not interrupt the supply of liquid to the duct 27 until the pressure in this duct exceeds by, for example, about 0.3 atm. the pressure in the container 14 and consequently the pressure of the gas to be sealed off. This amount is determined by the tension of the spring 32. The pressure of the sealing liquid is thus automatically reduced by the throttling member at any gas pressure to a pressure which exceeds by a predetermined amount the pressure actually prevailing in the isolated space 5.

The oil delivered by the pump 21 is simultaneously employed to supply a bearing 33 and a thrust bearing 34 of the compressor of the thermal power plant. Only a part of the shaft, designated by 35, of the rotor of the compressor is shown, with three mounted impellers 36. The working medium flows from an inlet chamber 37, in which a superatmospheric pressure obtains, into the first stage of the compressor.

Since that end of the shaft of the compressor which is shown is not coupled with a further engine, the bearing housing encloses the shaft end completely, so that the bearing point need not afford any liquid seal with respect to the atmosphere. The bearing is surrounded by a chamber 38 which communicates with the duct 12 in the same manner as the space 5 on the turbine side, and in which the pressure of the container 14 thus also prevails. Two labyrinth packings 39 and 40 separate a space 41 surrounding the shaft 35, on the one hand from the chamber 38 and on the other hand from the inlet chamber 37 of the compressor. Sealing gas is fed through the duct 10 to the chamber 41 as well as to the chamber 6.

The bearing areas 33, 34 are constantly under the gas pressure of the container 14, and are supplied with oil from the duct 27 through a duct 42. The action of the throttling member 26 already described is such that the bearing areas 33, 34 are also supplied with oil at a pressure somewhat higher than the pressure of the gas surrounding them, so that a sufficient flow of lubricating oil through these bearings is continuously ensured.

The oil escaping from the bearings 33, 34 flows through the duct 12 and 13 into the container 14 together with that escaping on the left-hand side at the bearing 4. The oil flowing in the direction of the atmosphere on the right-hand side of the bearing 4, on the other hand, is returned into the storage container 22 through a duct 43.

A valve 44 fitted in the container 14 regulates the escape of oil from this container into a duct 45 leading to the storage container 22. The valve 44 is actuated by pressure oil which is taken from the duct 23 through a duct 47 provided with a diaphragm 46, and acts on a piston 49 loaded by a spring 48. A float 50 closes an outlet point 51 for the control oil when the liquid level in the container 14 reaches a predetermined height. The pressure of the control oil below the piston 49 thus rises, the closure member of the valve 44 being lifted against the action of the spring 48 and permitting the escape of oil into the duct 45.

Thus, with the described arrangement, the bearing 4 serving to form the liquid seal and the further bearings 33, 34 subjected to pressure are always supplied with sealing or lubricating liquid which is under the necessary pressure exceeding by a predetermined amount the pressure of the gas to be sealed off. Instead of being loaded by the spring 32 as in the illustrated constructional form of the arrangement, the throttling member may be loaded, for example, by a weight, the magnitude of which determines the amount by which the pressure of the sealing liquid must exceed the pressure of the gas to be sealed off, or other suitable means for controlling the throttling member in the described manner may be employed.

The arrangement also operates correctly if the pressure level in the thermal power plant is varied for the purpose of regulating the output. Since the duct 10 is connected to a particular point of the circuit at the point 11, this pressure also simultaneously varies with the pressure level of the circuit. When the pressure rises, the valve 15 is closed, and the pressure in the space 5 and in the container 14 also rises correspondingly owing to the transfer of sealing gas through the labyrinth packing 8. On the other hand, when the pressure of the sealing gas falls, the valve 15 ensures that gas does not flow from the space 5 through the labyrinth 8 in the opposite direction. Such flow would create the danger that oil might be carried along and reach the hot turbine rotor by way of the labyrinth packing 7. A drop in the pressure of the sealing gas causes the valve 15 to rise, as a result of which gas is allowed to escape from the container 14 through the duct 19 in such a quantity that the pressure in this container always remains lower than the pressure of the sealing gas.

What is claimed is:

1. In a turbo-machine traversed by a gaseous medium at variable super-atmospheric operating pressure; at least one liquid seal for isolating a space within said machine from the atmosphere, which space contains gaseous medium at said variable super-atmospheric pressure; a pump for supplying liquid to said seal, and serving to bring the said liquid from atmospheric pressure to a fixed pressure which is higher than the highest value of said variable super-atmospheric pressure occurring in the course of operation of the turbo-machine; a flow connection between the delivery of said pump and said liquid seal; a pressure responsive throttling valve interposed in said flow connection, responsive to the variable super-atmospheric pressure prevailing in said isolated space and serving to reduce automatically the pressure of the sealing liquid supplied to said seal to a pressure which exceeds by a predetermined amount the pressure actually prevailing in the said isolated space; a separator for gas and liquid having a gas filled space in communication with said isolated space; means for releasing the separated liquid to the atmosphere; and differential pressure actuated valve means responsive to depression of said operating pressure below the pressure in said isolated space to vent said isolated space.

2. In a turbo-machine forming part of a thermal power circuit traversed by a gaseous working medium at variable super-atmospheric pressure, the variation of said pressure being incident to regulation of load fluctuation; at least one liquid seal for isolating a space from the atmosphere, which space receives at a restricted rate from said circuit gaseous working medium at said variable super-atmospheric pressure; a pump for supplying liquid to said seal, and serving to bring said liquid from atmospheric pressure to a fixed pressure which is higher than the highest value of said variable super-atmospheric pressure occurring in the course of operation of the thermal power circuit; a flow connection between the delivery of said pump and said liquid seal; a pressure responsive throttling valve interposed in said flow connection and responsive to the said variable super-atmospheric pressure prevailing in said isolated space so as to reduce automatically the pressure of the sealing liquid supplied to said seal to a pressure which exceeds by a predetermined amount the pressure actually prevailing in the said isolated space; a separator for gas and liquid having a gas filled space in communication with said isolated space; means for releasing the separated liquid to the atmosphere; pressure responsive valve means comprising a closure member which when open vents said isolated space, said valve means being subject in a valve-closing direction to pressure in the circuit and in a valve-opening direction to pressure in said isolated space; and yielding biasing means for said valve means.

References Cited in the file of this patent

UNITED STATES PATENTS

| 1,559,182 | Rice | Oct. 27, 1925 |
| 1,841,863 | Van Rijswijk | Jan. 19, 1932 |
| 2,501,304 | Baudry et al. | Mar. 21, 1950 |
| 2,608,380 | Rice | Aug. 26, 1952 |